April 27, 1965   B. A. HILL   3,180,247
APPARATUS FOR POPPING POPCORN AND THE LIKE
Filed Aug. 30, 1961   3 Sheets-Sheet 1

INVENTOR
Budd A. Hill
BY Mason, Fenwick & Lawrence
ATTORNEYS

April 27, 1965  B. A. HILL  3,180,247
APPARATUS FOR POPPING POPCORN AND THE LIKE
Filed Aug. 30, 1961  3 Sheets-Sheet 2
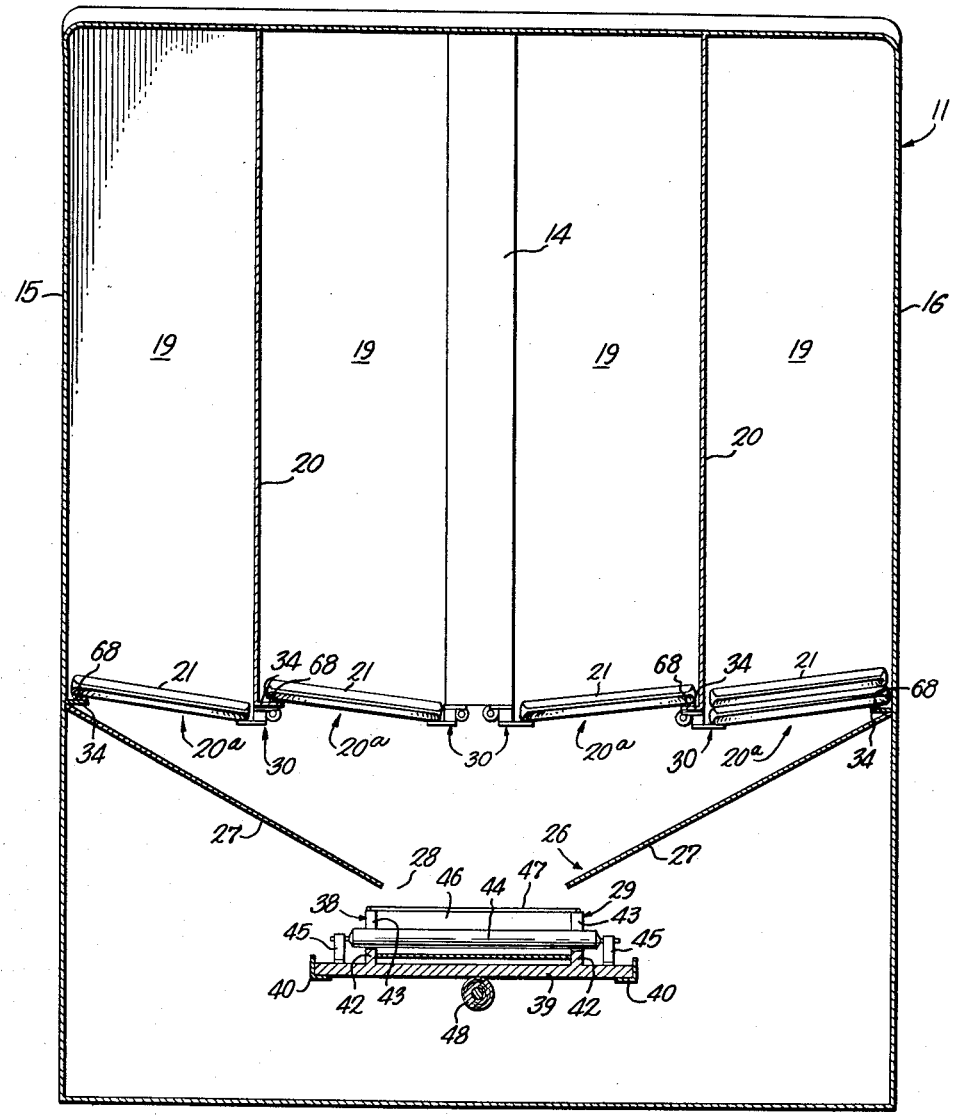
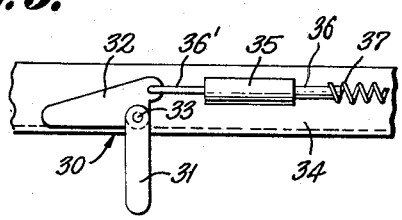
INVENTOR
*Budd A. Hill*
BY *Mason, Fenwick & Lawrence*
ATTORNEYS April 27, 1965 B. A. HILL 3,180,247
APPARATUS FOR POPPING POPCORN AND THE LIKE
Filed Aug. 30, 1961 3 Sheets-Sheet 3

INVENTOR
*Budd A. Hill*

BY
*Mason, Fenwick & Lawrence*
ATTORNEYS

United States Patent Office 3,180,247
Patented Apr. 27, 1965

3,180,247
APPARATUS FOR POPPING POPCORN
AND THE LIKE
Budd A. Hill, El Paso, Tex., assignor to Apache Products Corporation, El Paso, Tex., a corporation of Texas
Filed Aug. 30, 1961, Ser. No. 135,008
11 Claims. (Cl. 99—238.3)

The present invention relates in general to heating apparatus for popping popcorn and the like, and more particularly to vending apparatus for popping popcorn and like commodities by radiant heating of popping corn in sealed expansible bags responsive to insertion of a coin in the apparatus and promptly dispensing the same to a customer.

Heretofore, the popping of corn kernels of the type which are caused to pop has generally been performed by application of heat to the kernels under conditions requiring constant human manipulation and supervision to maintain proper temperature conditions and stop the process when most or all of the kernels have been popped before charring takes place. Such operations have been generally carried out by subjecting the popping corn to conductive heat in a basket or other suitable container while keeping the corn in constant random motion.

More recently, several types of popcorn vending machines have appeared on the market for dispensing popped corn in response to deposit of a suitable coin. One of the more common types of popcorn vending machines is the pre-pop type of machine wherein the corn is pre-popped with flavor and salt and bagged in one location, the popcorn bags are then sent to the vending operators who in turn truck them to their vending machines, where the bags are emptied into the vending machines and the popped corn is kept warm by a lamp or hotplate. Upon deposit of a coin, the popcorn is released into a cup that has been deposited into a position to receive the popcorn or the popcorn falls into a chamber and the customer withdraws a bag from a storage rack on the outside of the machine and manually fills the bag from the chamber.

In the pre-pop type of machine, the popcorn is frequently old, stale, rancid and cold, and rarely yields popcorn of the desired freshness, crispness or temperature. Such machines are large, bulky and expensive, and require an expensive cup dropping mechanism or an outside bag dispenser which many times is emptied before the popcorn is used. Furthermore, the popping, bagging, trucking and handling of the popcorn in connection with such machines is inconvenient and costly.

Another common type of commercial popcorn vending machine is the automatic pop type wherein unpopped popping corn kernels are stored in the machine, and upon insertion of a coin, a measuring device releases a selected amount of unpopped kernels, oil and salt onto a heating plate, means being provided for automatically agitating the corn while it is popping on the heating plate. When popping of the corn is completed, it is removed from the machine by one of the ways described in connection with the foregoing discussion of the pre-pop type of machine.

The automatic pop machines are also large, bulky and expensive. Further, after a short period of use, the machines become greasy, smelly, rancid and unclean, unless they are cleaned with great frequency. The popping time required in such machines is quite long, because of the care that must be taken to avoid charring of the kernels, and since the kernels are not kept in an air-tight chamber, they lose much of their moisture after a short time, resulting in reduction of popped kernel size and tenderness.

An object of the present invention is the provision of a method and apparatus for popping popcorn which obviates the disadvantages attendant to the above-described prior apparatus by retaining the popping corn in properly measured and seasoned quantities in sealed expansible bags which are individually released and heated in sealed condition to effect popping of the popcorn and dispensing of the freshly popped corn in their expansible bags.

Another object of the present invention is the provision of popcorn vending apparatus wherein flavored, unpopped corn kernels are stored in sealed expansible transparent plastic bags and are subjected to radiant heat while in the sealed bags to pop the kernels and dispense the sealed bag of popped corn to a customer responsive to deposit of a coin.

Another object of the present invention is the provision of popcorn vending apparatus of the type described in the preceding paragraph, wherein means are provided to facilitate rapid transfer of a bag of kernels to a heating zone and popping of the kernels therein without burning or adversely affecting the material of the bag during the heating process.

Another object of the present invention is the provision of novel popcorn vending apparatus of the type described in the preceding paragraphs, wherein novel heating means are provided to support the popcorn bag during heating and effect discharge of the same to the customer.

Other objects, advantages and capabilities of the present invention will become apparent from the following detail description, taken in conjunction with the accompanying drawings illustrating preferred embodiments of the invention.

In the drawings:

FIGURE 3 is a vertical section view of the machine, taken along the line 3—3 of FIGURE 2.

FIGURE 5 is a sectional view to enlarged scale of the mechanism for releasing the sealed bags of popping corn from the storage magazine, taken along the line 5—5 of FIGURE 2;

Figure 1:
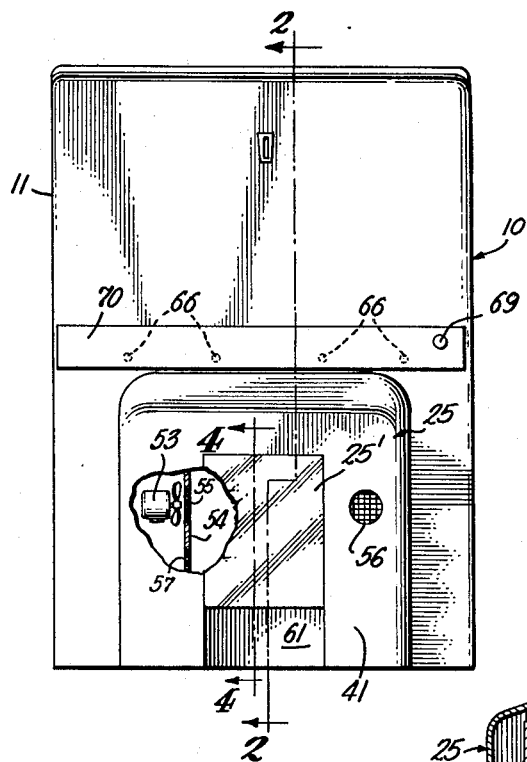
FIGURE 1 is a front elevation of a coin controlled popcorn vending machine embodying the present invention.
Figure 2:
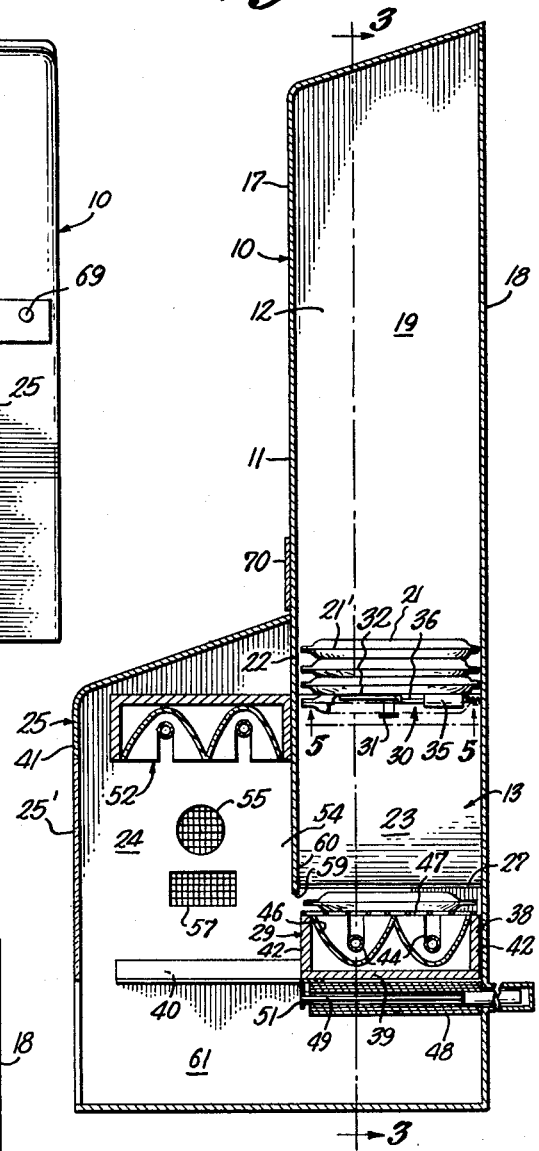
FIGURE 2 is a vertical section view of the popcorn vending machine taken along the line 2—2 of FIGURE 1.
Figure 4:
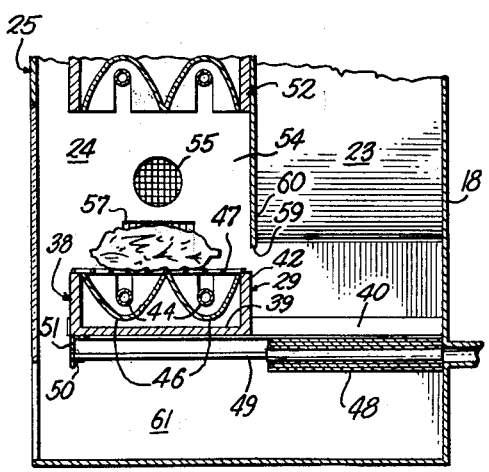
FIGURE 4 is a fragmentary vertical section view taken along the line 4—4 of FIGURE 1, showing the heating unit in the projected position it occupies when the bag of popping corn is being heated.

Referring to the drawings, wherein like reference characters designate corresponding parts throughout the several figures, and particularly to FIGURES 1 through 5, there is shown a coin-responsive automatic popcorn vending machine, designated generally by the reference character 10, which serves to store, heat and dispense the popcorn, which includes a cabinet 11 having an upper section 12 for storing sealed bags of unpopped popcorn, and a lower section 13 to which the bags of popping corn are deposited, heated to effect popping of the popcorn, and dispensed to the customer. The upper storage zone 12 includes a coin mechanism 14 of conventional construction which senses the coin deposited in the machine to determine that it is the proper coin for actuation of the machine and conditions suitable electrical circuitry described hereinafter for performance of the cycle of operations necessary to achieve dispensing of freshly popped popcorn to the customer. Such coin mechanisms are well known in the art and need not be specifically described here. Disposed between the side walls 15, 16, upper front wall 17, and rear wall 18 in the upper portion 12 of the cabinet are a plurality of vertically arranged storage magazines or compartments 19, four of which are illustrated in the accompanying drawings, formed conveniently by vertically extending partitions 20 and terminating in open lower ends 20a. These storage magazines 19 are rectangular in horizontal cross-section in the illustrated embodiment to conform to the peripheral configuration of the bags or packages of popping corn stored therein, indicated generally by the reference character 21.

The packages of unpopped popcorn are preferably expansible bags 21 of a transparent thermosetting or thermoplastic sheet material or similar semitransparent material, such as cellophane, which are completely sealed as by heat sealing an edge or edges of the bag to protect the corn kernels against air and are provided with gussets or other suitable folds 21' at, for example, the opposite sides thereof to facilitate expansion of the bags responsive to expansion of the popcorn kernels when they are popped. These bags 21 will preferably be preloaded with kernels of popcorn which have been coated or otherwise intermixed with seasoning, oil, butter or margarine or other materials necessary to the proper popping of the kernels and protection of the desired flavor. It will be appreciated that these bags 21 will assume a relatively flat condition of small volume when stored within the magazines 19, enabling a large number of the bags to be stored in stacked condition in relatively small space.

The lower section 13 of the cabinet 11 is divided by a cabinet wall portion 22 tinto a rear zone 23 below the storage magazines 19 and a front zone 24 extending forwardly of the plane of the upper front wall 17 and enclosed by a projecting cabinet portion 25. The rear zone 23 contains a chute 26 formed for example by a pair of downwardly converging sheet members 27 having a discharge opening 28 at the lower end of the chute for depositing a bag 21 released from any of the laterally spaced storage magazines 19 onto the heating unit 29.

A drop mechanism 30 is provided at the lower end of each storage magazine 19 to release a single bag 21 from the bottom of the stack of bags in the associated magazine 19 for each actuation of the drop mechanism. As best shown in FIGURES 3 and 5, each drop mechanism comprises a pair of arms 31, 32 which are rigidly interconnected extending horizontally at approximately right angles to each other from a vertical pivot 33 mounted at the lower ends of the magazine defining partitions 20, the arm 32 being spaced vertically above the arm 31 a distance approximating the depth of the bag 21 of unpopped corn. The drop mechanism arms 31, 32 normally occupy the position illustrated in FIGURE 5 wherein the lower arm 31 underlies the adjacent edge portion of the bottom bag 21 in the adjacent stack and cooperates with the shelf-like lip or flange 34 projecting from the lower end of the opposite partition 20 of the associated magazine 19 to support the stack of bags 21 in the magazine. A solenoid 35 has a horizontally reciprocative plunger 36 which is resiliently biased by spring 37 to projected position and is coupled as by link 36' to the arm 32 at an eccentric point relative to the pivot 33. Upon actuation of the solenoid 35, retraction of the plunger 36 rotates the arms 31, 32 in a counterclockwise direction as viewed in FIGURE 5, shifting the arm 31 from beneath the edge of the bottom bag 21 of the associated storage stack to release the bottom bag 21 gravitationally into the chute 26 and concomitantly shifting the upper arm 32 in slightly lagging relation under the adjacent edge portion of the next bag 21 in the stack. When the solenoid 35 is deenergized, the spring 37 returns the plunger 36 to projected position, withdrawing the arm 32 progressively from beneath the bottom bag 21 in the stack at the conclusion of the return stroke, whereupon the bottom bag drops onto the arm 31, which is then projecting into the discharge path of the magazine.

The heating unit 29 onto which the bag 21 of unpopped corn is deposited gravitationally through the opening 28 in the chute 26 is constructed in the form of an upwardly opening tray 38 having a bottom 39 which is slidably supported at the lateral corners thereof on fore and aft guide rails 40, formed for example of angle irons, extending horizontally from the rear wall 18 of the cabinet 11 through the rear zone 23 and the larger portion of the front zone 24 to a point adjacent the front wall 41 of the forwardly projecting cabinet portion 25. The tray 38 has laterally spaced upright side walls 42 provided with upwardly opening slots 43 for receiving a pair of elongated infrared radiant heating bulbs 44 or similar heat sources mounted in suitable conductor terminal clips 45 supported on the bottom 39 of the tray. Upwardly opening parabolic reflectors 46 extend between and are supported by the side walls 42 and are directed in a suitable path to reflect the radiant heating rays emanating from the lamps 44 upwardly toward a grill 47 or other suitable perforated planar support mounted on the upper edges of the side walls 42 to form a horizontal supporting surface for the bag of unpopped corn. The heating unit 29 normally occupies the rearward position illustrated in FIGURE 2 wherein the grill 47 is disposed directly below and in registry with the discharge opening 28 of the chute 26. A solenoid 48 is mounted on the rear wall of the cabinet below the guide rails 40 and has a plunger 49 rigidly connected by an extension 50 to a projection 51 depending from the bottom 39 of the tray 38 for reciprocating the tray 38 along the guide rails 40 between the rearmost bag receiving position illustrated in FIGURE 2 and the forwardly projected position illustrated in FIGURE 4 which the heating unit occupies during heating of the popcorn to pop the same.

A similar downwardly directed heating unit 52 having a construction corresponding to that of the heating unit 29 may optionally be disposed in the upper region of the forward zone 24 within the cabinet portion 25 to direct radiant heating rays downwardly on the bag 21 when the bag is disposed in the forward heating zone 24.

Since known transparent or semitransparent sheet material for popcorn bags which would be commercially acceptable are subject to charring, disintegration, or other undesirable changes when exposed to radiant heating rays or heat of conduction of sufficient intensity to pop the popcorn kernels, steps must be taken to prevent the occurrence of such undesirable effects. It has been found that by the use of infrared radiant heating units of the type herein disclosed, effective popping of the popcorn in the sealed bags 21 may be accomplished without undesirable effects on the bag if suitable forced air ventilating means are provided to force air over and about the surfaces of the bag while it occupies the heating zone 24. Accordingly, fans 53 may be supported within the forwardly projecting cabinet portion 25, for example on intermediate partitions 54 laterally flanking the heating units 29 and 52 in the heating zone 24 for forcing ambient air through fan outlet openings 55 in the partitions 54 toward the bag 21 supported on the tray 38 when the tray is in the forwardly projected position. Suitable air inlet openings 56 may also be provided in the side or front portions of the cabinet portion 25, and air exhaust openings 57 should be provided in the intermediate partitions 54 to permit passage of air from the heating zone 24. By maintaining constant ambient air circulation over the surfaces of the bag 21 when the bag occupies the heating zone, effective heating and popping of the popcorn within the sealed bag 21 may be achieved without encountering undesirable effects on the bag itself.

It will be appreciated that the enlargement of the mass of popcorn kernels as they pop effects a substantial expansion of the volume of the popcorn while it is being heated on the grill 47 of the heating unit 29, which expansion is accommodated by expansion of the sealed bag 21 due to its gusseted or folded construction. Thus, the depth of the bag increases substantially from its original relatively flat condition while it is undergoing heating in the forward zone 24. The interior vertical plate portion 22 which divides the rear zones 23 from the forward heating zone 24 extends downwardly from a point adjacent the bottom of the storage magazine 15 to a level spaced just above the grill 47 of the heating unit 29 which is of sufficient height to permit passage of a flat bag 21 of unpopped kernels below the lower edge 59 of the wall portion 22 while preventing passage of an expanded bag 21 after it has been heated in the zone 24. The portion 60 of the wall portion 22 therefore serves as a stop plate in the return path of an expanded bag 21 during retraction of the heating unit 29 along the guide rail 40 to the rearmost position, whereby the plate portion 60 will wipe expanded bag 21 off of the grill 47 during the retraction stroke of the heating unit 29 and permit the bag to fall into the removal chamber 61 in the bottom portion of the cabinet projection 25.

Figure 6:
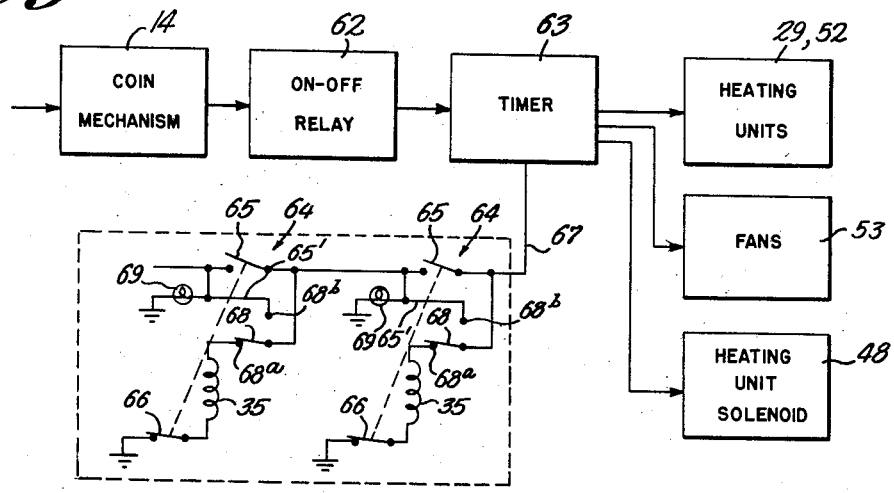
FIGURE 6 is a block diagram of an electrical control system usable in the vending machine.

Referring now to FIGURE 6 illustrated in broken diagram form, an exemplary control circuit which may be employed in the vending machine of the subject invention, the coin mechanism 14 provides an output to an on-off relay 62, which, when in the on position, supplies power from a suitable 110 volt source to a conventional timer unit 63 set to energize the heating unit 29, the heating unit solenoid 48, and the fans 53 in preselected timed relationship. The timer 63 also supplies power to a plurality of bin switch units 64, each comprising interlocked switches 65 and 66 arranged so that when one is closed, the other is open. The switches 65 of the bin switch units 64 are connected in series circuit relation to the output lead 67 of the timer 63 and the switch 66 of the each bin switch unit 64 is connected between ground and one end of one of the drop mechanism solenoids 35, the other end of the drop mechanism solenoid 35 being connected to the normally closed contact 68a of an empty switch 68 and the movable contact arm of the switch 65, the empty switch 68 being provided at the bottom of the associated storage magazine 19 to be closed by the weight of bags 21 in the magazine 19 and to be resiliently biased to open condition whenever the associated magazine becomes empty. The stationary contact of each switch 65 is connected through a by-pass lead 65' to a normally open contact 68b of the empty switch 68 and an empty light 69 to ground and to the movable contact arm of the switch 65 of the next succeeding bin switch unit. The switches 66 of the bin switch units 64 are push-button switches associated respectively with each of the storage magazines 19 and arranged in a transversely aligned row along the upper front wall 17 of the cabinet 11. A plate 70 may be removably mounted on the upper front wall portion 17 of the cabinet 11 to extend over and close all of the selector switches 66 and to cover all of the empty lights 69 except the last one to cause the unit to sequentially empty the storage magazines 19 upon deposit of coins in the coin mechanism 14, the plate 70 being removed when it is desired to permit selection by the customer of the storage magazine from which the bag is to be released.

The timer 63 is adjusted so that when the on-off relay 62 is activated responsive to deposit of the proper coin in the coin mechanism 14, the heating unit 29 and fans 53 are energized and voltage is applied to the output lead 67 to apply current through the closed switch 68 to the drop mechanism solenoid 35 associated with one of the storage magazines 19. Assuming the plate 70 has been mounted on the cabinet to maintain all of the selector switches 66 closed, and bags 21 remain in the first or left-hand magazine 19 as viewed in FIGURE 2, voltage will be applied to the associated drop mechanism solenoid 35 to activate the drop mechanism arms 31, 32 and release the bottom bag 21 into the chute 26. A suitable time delay interval after initial activation of the drop mechanism, the heater unit solenoid 48 will be energized by the timer 63 to project the heater unit 29, into which the bag 21 has been deposited, to the forwardmost position beyond the vertical plane of the stop plate 60. After a suitable heating interval regulated by the timer, during which the corn has been popped, the lamps of the heating unit 29, and the upper heating unit 52, if present, will be turned off, and the fans 53 will be turned off a short delay interval thereafter. At that time, the timer 63 deenergizes the heating unit solenoid 48 to retract the heating unit 29, during which the expanded bag 21 of popped popcorn will be wiped off of the grill 47 by the plate 60 and gravitationally discharged to the removal chamber 61. If the first or left-hand storage magazine 19 is empty, the movable arm of the empty switch 68 for that magazine will open the contact 68a and engage the contact 68b, preventing energization of the associated drop mechanism solenoid 35 and by-passing voltage from the lead 67 through the by-pass lead 65' to the next succeeding bin switch unit.

The cycle of operation is similar if the machine is desired to dispense different flavors or products from the different storage magazines 19, in which case the plate 70 will be removed from the cabinet so that all of the selector switches 66 will be in normally open position. In this case, the desired selector switch 66 must be manually depressed by the customer following deposit of the coin to effect actuation of the appropriate drop mechanism solenoid 35 and release one of the bags from the selected magazine 19 through the chute 26 onto the heating unit 29.

To stimulate commercial sales appeal and favorable customer reaction to the vending machine, the portion of the cabinet extension 55 in front of the heating zone 24 may be provided with a transparent window 25' of suitable heat resistant material to permit the customer to observe the popping process, and an amplifier, sound make up and speaker unit for producing amplified reproductions of the corn popping sounds and record amplifying and reproducing means may be provided in the cabinet and controlled by the timer.

Figure 7:
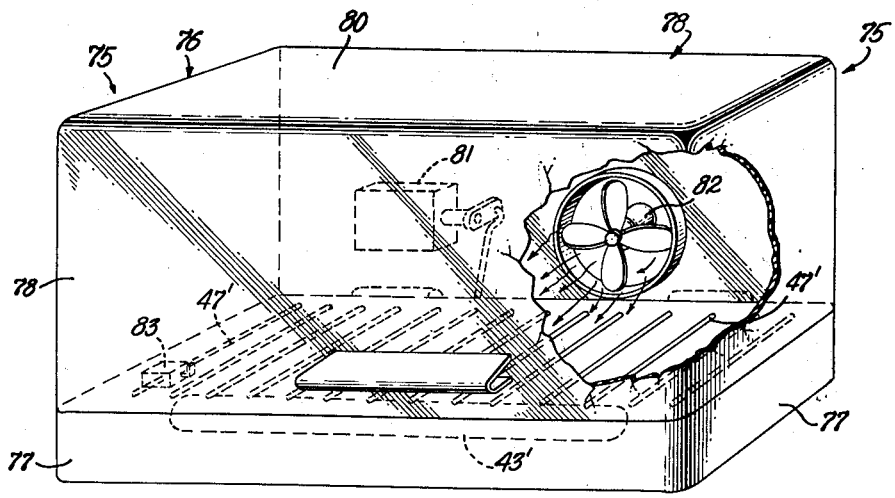
FIGURE 7 is a perspective view of a home popcorn popping unit embodying the present invention.

The principles of the above-described vending machine may also be incorporated, if desired, in a home unit for popping popcorn in the sealed bags 21, such a home unit being illustrated in FIGURE 7 and indicated generally by the reference character 75. The home unit 75 may be housed in a box-like casing 76 having a lower tray portion 77 and an upper hinged cover 78. The tray portion will be constructed similar to the heating unit 29, in that it includes one or more infrared radiant heating lamps 43' and associated reflectors, and a top grill 47' on which the bag 21 of unpopped corn may be manually deposited and supported during heating. The cover 78 is preferably of transparent material to permit observation of the heating procedure and the top 80 is of sufficient height above the grill 47' to accommodate the height of the bag 21 when it has expanded. A spring timer mechanism 81 is carried by the cover 78 and so related to the tray portion 77 that the spring of the timer will be cocked responsive to lifting of the cover 78 and the timer 81 will be released to start the timing cycle when the cover 78 is closed down. A fan 82 or fans may be supported on either the cover 78 or tray 77 to circulate air drawn through suitable openings in the cover 78 over the bag 21 to prevent charring or other adverse effects on the bag material during popping of the popcorn. The fan 82 and radiant heating lamps 43' will be energized and deenergized in properly timed relation and for suitable periods to pop the popcorn by the timer 81. To prevent the unit from being turned on without a bag of popcorn in the unit, an edge of the grill 47' may rest on a switch arm 83 or the like which is normally biased to open condition against the weight of the grill 47' but which is closed responsive to the additional weight of a bag of popcorn deposited on the grill.

While but two preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for popping unpopped corn kernels and the like by radiant heat in sealed transparent plastic bags containing measured quantities of corn kernels wherein the bags are of a material penetratable by radiant heat rays and subject to destructive burning or charring under heating conditions necessary to achieve rapid popping of the kernels comprising a cabinet having a plurality of air inlet and outlet openings therein, an upwardly opening tray member in said cabinet having an openwork grill supported in substantially horizontal relation along the top thereof for supporting one of the sealed bags of unpopped kernels thereon, at least one infrared radiant heating lamp disposed in said tray below said grill for radiating radiant heating rays over a zone to be occupied by the sealed bag on said grill to penetrate the bag and pop the kernels therein while the bag remains in sealed condition, fan means supported in said cabinet above and adjacent said grill for circulating ambient air to the zone to be occupied by the sealed bag on said grill along the surfaces of the bag to maintain the temperature of the bag material below deleterious temperature levels, and timer means including means for energizing said infrared radiating lamp for a sufficient period to pop the kernels and means for energizing said fan means upon energization of said lamp for a period terminating after deenergization of the lamp.

2. In a corn popping machine for popping corn kernels in sealed expansible bags permeable by radiant heating energy, a cabinet, a radiant heating unit including a casing and a substantially horizontal support surface adjacent the top of said casing for supporting one of the bags of corn kernels, guide means slidably supporting said heating unit casing for reciprocative movement between first and second horizontally spaced position, means for delivering one of the bags of unpopped corn kernels to said heating unit and depositing the same on said support surface when said heating unit occupies said first position, means for advancing said heating unit from said first position to said second position and returning the same to said first position, means for activating said heating unit to emit radiant heating energy toward the bag supported on said support surface for popping the corn kernels in said bag and thereby expanding the bag upwardly relative to said support surface when the heating unit occupies said second position, and a stationary strike-off plate spaced above the path of travel of the bag on said support surface between said first and second positions disposed relative to said path to permit passage of the bag to said second position during advancing movement of said heating unit and to intercept the bag when expanded by popping of the corn kernels during return movement of the heating unit to said first position to strike the bag from said support surface.

3. In a corn popping machine for popping corn in sealed expansible bags, a cabinet having a heating chamber and a bag delivery zone therein, a radiant heating unit having a substantially horizontal support surface for supporting a bag of corn kernels, means slidably supporting said heating unit for reciprocating movement between a first position spaced from said heating chamber and a second position horizontally spaced therefrom, means for delivering a bag of unpopped corn kernels to said heating unit and depositing the bag on said support surface when said heating unit occupies said first position, means for shifting said heating unit through an advance stroke from said first position to said second position and returning the heating unit to said first position, means for activating said heating unit to emit radiant heating energy toward the bag supported on said support surface for popping the corn kernels therein and thereby expanding the bag when the heating unit occupies said second position, ambient air circulating means adjacent said heating chamber for forcing ambient air along the surfaces of the bag on said support surface while the heating unit occupies said second position to prevent deleterious heating of the bag by the radiant heating energy, and a stationary strike-off plate spaced above the path of travel of the bag on said support surface between said first and second positions disposed relative to said path to permit passage of the bag to said second position during advancing movement of said heating unit and to intercept the bag when expanded by popping of the corn kernels during return movement of the heating unit to said first position to strike the bag from said support surface.

4. In a corn popping machine for popping corn kernels in sealed expansible bags permeable by radiant heating energy, a cabinet having a bag storage zone, a bag discharge zone below said storage zone, and a heating chamber spaced horizontally from said bag discharge zone, a plurality of storage compartments for supporting vertically arranged stacks of sealed bags of unpopped popcorn kernels, each of said storage compartments having a discharge opening at the bottom thereof, a radiant heating unit including a casing and a substantially horizontal support surface adjacent the top of said casing for supporting one of the bags of corn kernels, guide means slidably supporting said heating unit casing for reciprocative movement between a first position in said bag discharge zone below said storage zone and a second position within said heating chamber spaced horizontally from said first position, means for releasing the bags of unpopped corn kernels one at a time from said storage compartments and depositing the same on said support surface when the heating unit occupies said first position, means for advancing said heating unit from said first position to said second position and returning the same to said first position, means for activating said heating unit to emit radiant heating energy toward the bag supported on said support surface for popping the corn kernels in said bag and thereby expanding the bag upwardly relative to said support surface when the heating unit occupies said second position, ambient air circulating means adjacent said heating chamber for forcing ambient air along the surfaces of the bag on said support surface while the heating unit occupies said second position to prevent deleterious heating of the bag by the radiant heating energy, and a stationary strike-off plate spaced above the path of travel of the bag on said support surface between said first and second positions disposed relative to said path to permit passage of the bag to said second position during advancing movement of said heating unit and to intercept the bag when expanded by popping of the corn kernels during return movement of the heating unit to said first position to strike the bag from said support surface.

5. In a corn popping machine for popping corn kernels in sealed expansible bags permeable by radiant heating energy, a cabinet having a bag storage zone, a bag discharge zone below said storage zone, and a heating chamber spaced horizontally from said bag discharge zone, a plurality of storage compartments for supporting vertically arranged stacks of sealed bags of unpopped popcorn kernels, each of said storage compartments having a discharge opening at the bottom thereof, a radiant heating unit including a casing and a substantially horizontal support surface adjacent the top of said casing for supporting one of the bags of corn kernels, guide means slidably supporting said heating unit casing for reciprocative movement between a first position in said bag discharge zone below said storage zone and a second position within said heating chamber spaced horizontally from said first position, bag release means adjacent the bottom of each of said storage compartments for releasing the bottommost bags in the storage compartments one at a time in selected relationship for gravitational discharge onto the support surface of said radiant heating unit when the latter occupies said first position, means for advancing said heating unit from said first position to said second position and returning the same to said first position, means for activating said heating unit to emit radiant heating energy toward the bag supported on said support surface for popping the corn kernels in said bag and thereby expanding the bag upwardly relative to said support surface when the heating unit occupies said second position, ambient air circulating means adjacent said heating chamber for forcing ambient air along the surfaces of the bag on said support surface while the heating unit occupies said second position to prevent deleterious heating of the bag by the radiant heating energy, and a stationary strike-off plate spaced above the path of travel of the bag on said support surface between said first and second positions disposed relative to said path to permit passage of the bag to said second position during advancing movement of said heating unit and to intercept the bag when expanded by popping of the corn kernels during return movement of the heating unit to said first position to strike the bag from said support surface.

6. In a corn popping machine, the combination recited in claim 2 wherein said radiant heating unit comprises a casing in the form of an upwardly opening tray having substantially vertical side walls and a bottom, a grill member removably supported on said casing adjacent the upper edges of said side walls forming the support surface for said bag, a plurality of elongated, horizontally disposed infrared radiant heating lamps disposed in said casing between said grill member and said bottom, and reflector members adjacent said lamps for directing radiant heating rays emanating from said lamps substantially throughout the area of said grill.

7. In a corn popping machine for popping corn in sealed expansible bags, a cabinet having a heating chamber and a bag delivery zone therein, a radiant heating unit having a substantially horizontal support surface for supporting a bag of corn kernels, means slidably supporting said heating unit for reciprocating movement between a first position spaced from said heating chamber and a second position horizontally spaced therefrom, means for delivering a bag of unpopped corn kernels to said heating unit and depositing the bag on said support surface when said heating unit occupies said first position, means for shifting said heating unit through an advance stroke from said first position to said second position and returning the heating unit to said first position, means for activating said heating unit to emit radiant heating energy toward the bag supported on said support surface for popping the corn kernels therein and thereby expanding the bag when the heating unit occupies said second position, ambient air circulating means adjacent said heating chamber for forcing ambient air along the surfaces of the bag on said support surface while the heating unit occupies said second position to prevent deleterious heating of the bag by the radiant heating energy, and strike-off means with respect to which the heating unit is relatively movable disposed adjacent the path of travel of the bag on said support surface between said first and second positions for striking the expanded bag from said support surface during return movement of said bag to said first position, said radiant heating unit comprising a casing in the form of an upwardly opening tray having substantially vertical side walls and a bottom, a grill member removably supported on said casing adjacent the upper edges of said side walls forming the support surface for said bag, a plurality of elongated, horizontally disposed infrared radiant heating lamps disposed in said casing between said grill member and said bottom, and reflector members adjacent said lamps for directing radiant heating rays emanating from said lamps substantially throughout the area of said grill.

8. In a corn popping machine, the combination recited in claim 3 wherein said radiant heating unit comprises a casing in the form of an upwardly opening tray having substantially vertical side walls and a bottom, a grill member removably supported on said casing adjacent the upper edges of said side walls forming the support surface for said bag, a plurality of elongated, horizontally disposed infrared radiant heating lamps disposed in said casing between said grill member and said bottom, and reflector members adjacent said lamps for directing radiant heating rays emanating from said lamps substantially throughout the area of said grill.

9. In a corn popping machine, the combination recited in claim 2 wherein said expansible bags are transparent plastic bags having gusset folds at a pair of edges thereof permitting expansion of the height of the bags responsive to popping of the popcorn kernels contained therein, and said stationary strike-off plate having a horizontal edge portion positioned relative to the path of movement of the support surface of said heating unit to be disposed slightly above the path of travel of the uppermost portion of the bag on the support surface when the kernels therein are in unpopped condition but lying below the uppermost portion of the bag when in expanded position to intercept the expanded bag during return movement of the heating unit from said second position and strike the bag from said support surface to gravitationally discharge the same to a bag removal zone.

10. In a corn popping machine, the combination recited in claim 3 wherein said expansible bags are transparent plastic bags having gusset folds at a pair of edges thereof permitting expansion of the height of the bags responsive to popping of the popcorn kernels contained therein, and said stationary strike-off plate having a horizontal edge portion positioned relative to the path of movement of the support surface of said heating unit to be disposed slightly above the path of travel of the uppermost portion of the bag on the support surface when the kernels therein are in unpopped condition but lying below the uppermost portion of the bag when in expanded position to intercept the expanded bag during return movement of the heating unit from said second position and strike the bag from said support surface to gravitationally discharge the same to a bag removal zone.

11. In a corn popping machine, the combination recited in claim 5 wherein said expansible bags are transparent plastic bags having gusset folds at a pair of edges thereof permitting expansion of the height of the bags responsive to popping of the popcorn kernels contained therein, and said stationary strike-off plate having a horizontal edge portion positioned relative to the path of movement of the support surface of said heating unit to be disposed slightly above the path of travel of the uppermost portion of the bag on the support surface when the kernels therein are in unpopped condition but lying below the uppermost portion of the bag when in expanded position to intercept the expanded bag during return movement of the heating unit from said second position and strike the bag from said support surface to gravitationally discharge the same to a bag removal zone.

References Cited by the Examiner

UNITED STATES PATENTS

| | | | |
|---|---|---|---|
| 2,241,938 | 5/41 | Wilsey | 99—238.2 |
| 2,287,956 | 6/42 | Aff | 99—358 X |
| 2,590,580 | 3/52 | Schiavone | 99—238.2 |
| 2,864,932 | 12/58 | Forrer | 99—1 X |
| 2,930,312 | 3/60 | Richman et al. | 99—358 X |
| 2,957,973 | 10/60 | Torrez | 219—19.2 X |
| 3,003,409 | 10/61 | Mills | 99—446 X |

ROBERT E. PULFREY, *Primary Examiner.*

GEORGE A. NINAS, Jr., JEROME SCHNALL,
*Examiners.*